United States Patent
Niemi

[19]
[11] Patent Number: 6,138,540
[45] Date of Patent: Oct. 31, 2000

[54] METHOD AND CUTTING INSERT FOR THREADING

[75] Inventor: Matti Niemi, Fagersta, Sweden

[73] Assignee: Seco Tools AB, Fagersta, Sweden

[21] Appl. No.: 09/051,751

[22] PCT Filed: Sep. 10, 1996

[86] PCT No.: PCT/SE96/01125

§ 371 Date: Apr. 20, 1998

§ 102(e) Date: Apr. 20, 1998

[87] PCT Pub. No.: WO97/16277

PCT Pub. Date: May 9, 1997

[30] Foreign Application Priority Data

Oct. 31, 1995 [SE] Sweden .................................. 9503824

[51] Int. Cl.[7] ........................................................ B23B 1/00
[52] U.S. Cl. ............................... 82/1.11; 407/24; 407/25; 407/113; 407/114
[58] Field of Search ................................ 82/1.11; 407/24, 407/25, 113, 114; 408/215, 217, 222; 470/198, 199, 200; 409/65, 66

[56] References Cited

U.S. PATENT DOCUMENTS

| | | |
|---|---|---|
| 688,098 | 12/1901 | Knappe ..................................... 407/25 |
| 4,278,370 | 7/1981 | Spear . |
| 4,572,713 | 2/1986 | Schmidt .................................. 407/114 |
| 4,575,888 | 3/1986 | Murén . |
| 4,666,348 | 5/1987 | Correte ....................................... 407/24 |
| 4,674,924 | 6/1987 | Carlsson et al. . |
| 4,955,937 | 9/1990 | Dona et al. .............................. 82/1.11 |
| 5,765,972 | 6/1998 | Ericksson et al. ...................... 407/114 |

FOREIGN PATENT DOCUMENTS

| | | |
|---|---|---|
| 119 175 A1 | 9/1984 | European Pat. Off. . |
| 178 273 A2 | 4/1986 | European Pat. Off. . |
| 1349113 | 5/1991 | U.S.S.R. ................................. 407/113 |
| WO 95/07159 | 3/1995 | WIPO . |

*Primary Examiner*—Henry W. H. Tsai
*Attorney, Agent, or Firm*—Burns, Doane, Swecker & Mathis, L.L.P.

[57] ABSTRACT

The present invention relates to a method and a cutting insert for threading. The method aims to produce a thread in a rotary work piece. The threading insert has a polygonal basic shape including at least one cutting corner. The cutting corner has two cutting tips with different projections which cutting tips each comprises a cutting edge, which is provided to form a thread top substantially between the cutting tips. The total projected length of the cutting edge is smaller than two thread pitches.

12 Claims, 4 Drawing Sheets

Fig. 3
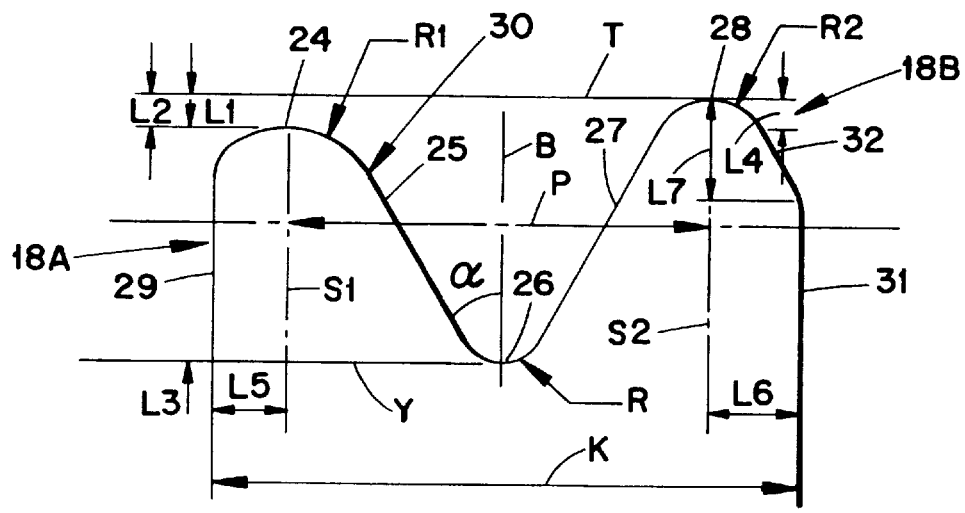
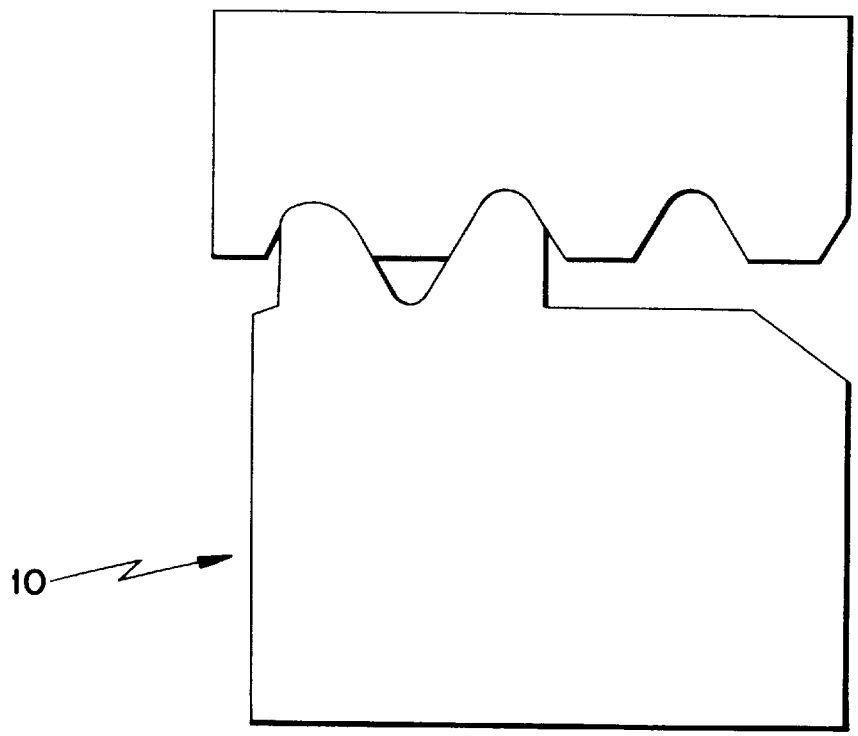
Fig. 5

6,138,540

METHOD AND CUTTING INSERT FOR THREADING

The present invention relates to a method and a cutting insert for threading. The method aims to produce a thread in a rotary work piece, wherein a threading insert, including at least two cutting tips, creates the shape of the thread through a number of passes along the work piece. The invention further relates to a threading insert.

PRIOR ART

At threading in a turning operation cutting inserts are often used which consist of an insert body including one or more cutting edges. Typical for these cutting edges are that they are geometrically designed such that they can generate a thread on a rotary work piece through chip removing machining. The threads which are made thereby obtain a certain profile, for example ISO, UN, Whitworth etc., and they have a pitch. Conventional threading inserts of the full profile insert type are constructed such that the cutting edge comprises a thread profile, whose largest width is identical to the pitch and whose cutting insert tip form for example a 60° profile angle. A threading insert of this type has its weakest point at the outermost part of the cutting insert tip. That depends on that the tip is submitted to the largest strain at conventional threading, by having the extreme tip portion cutting during all passes until full depth of thread.

It is previously known through for example U.S. Pat. No. 4,575,888 to provide a number of cutting tips on the same cutting corner to reduce the number of passes until obtaining the finished thread. The possibilities to use such an insert with multiple teeth are however limited since they require a large thread clearance and rigid working conditions since the long active cutting edge will lead to large cutting forces.

At flank infeed a chip is obtained with a rectangular cross section, which is easy to shape and to manage in comparison with a chip from the radial infeed, when the chip may assume a rigid V-shaped cross section. This fact together with a more efficient heat deduction from the cutting insert corner makes it possible to work with larger chip thickness and to complete the thread with the same number of passes as by radial infeed. When a conventional threading insert is fed parallel with one flank of the thread, the cutting edge however abutting against the same flank will not produce any intrinsic cutting work but will only drag along the flank, which will have an abrasive effect on the cutting edge and which can give bad surface finish on the thread flank. One has tried to feed the cutting insert tip at an angle which is smaller than the flank angle for avoiding these negative effects but then obtained chips from the side of the minor cutting edge which have been thin and entangled, which have influenced tool life and surface finish.

OBJECTS OF THE INVENTION

One object of the present invention is to provide a threading insert which combines the good properties of radial infeed and flank infeed, that is, the practical simple method with radial infeed is combined with good chip control from flank infeed.

Another object of the present invention is to provide a multiple teethed threading insert, which does not require a large thread clearance in the work piece or extremely rigid working conditions.

Another object of the present invention is to provide a threading insert, which obtains a good tool life by having several cutting tips dividing the work load.

Another object of the present invention is to provide a threading insert, which reduces the time for processing at threading.

Still another object of the present invention is to provide a method for producing a thread while having good production economy.

DESCRIPTION OF THE DRAWINGS

FIG. 3 shows tips of the threading insert.

FIG. 5 shows the tip of the threading insert in engagement with a work piece.

DETAILED DESCRIPTION OF THE INVENTION

Figure 1:
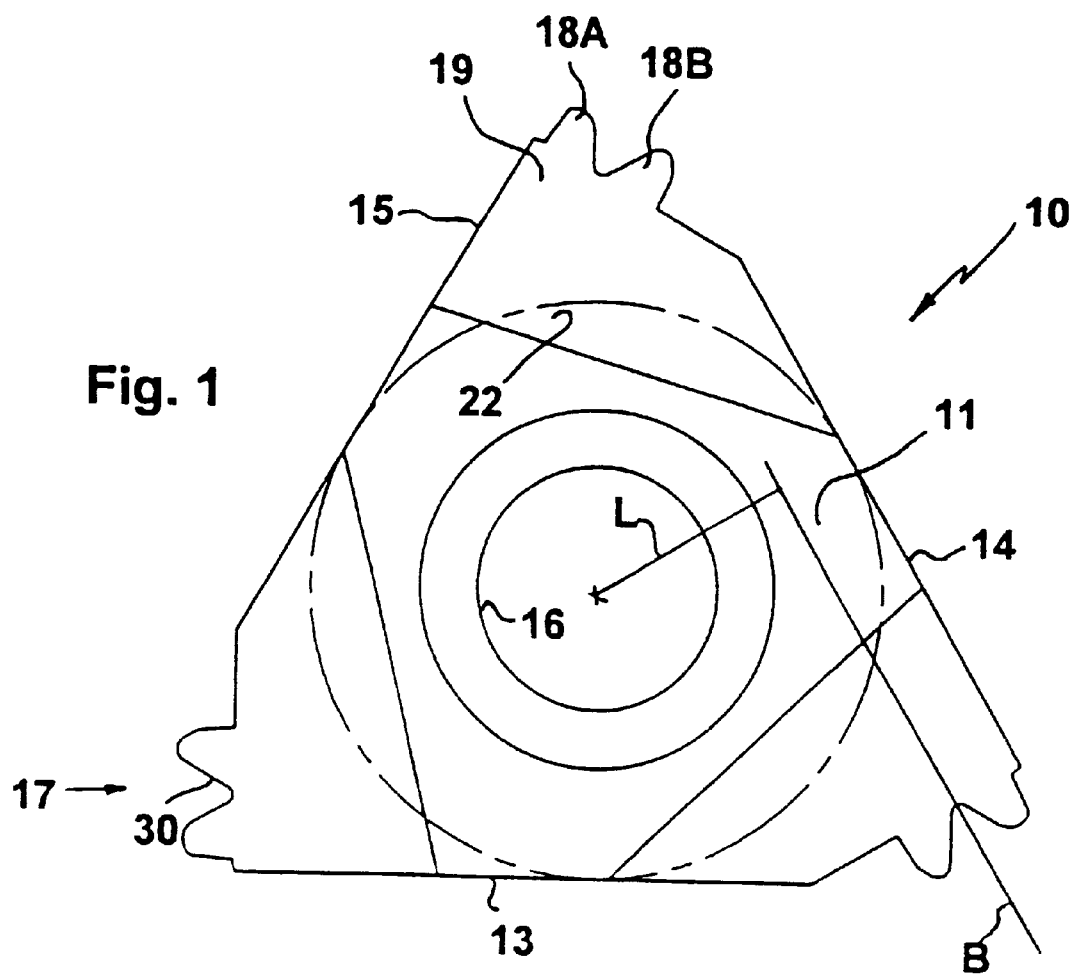
FIG. 1 shows a threading insert according to the present invention, in a top view.
Figure 2:
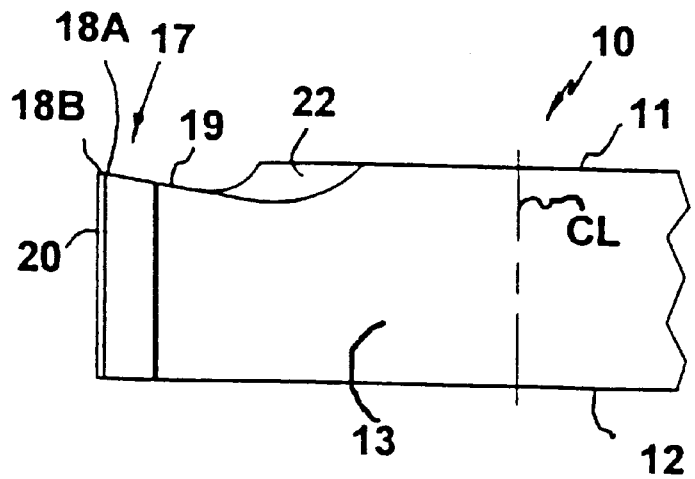
FIG. 2 shows the threading insert, in a side view.

With reference to FIGS. 1 and 2 a cutting insert according to the present invention is designated by 10. The cutting insert in the illustrated embodiment has contours adapted to an external cylindrical thread with ISO-profile and is preferably made in coated cemented carbide. Another polygonal basic form as illustrated embodiment could have been chosen, e.g. rectangular, square, rhombic, or similar. Furthermore, the cutting insert can be chosen for tangential mounting instead of the shown radially mounted, clamping method. The cutting insert has a substantially triangular basic form and comprises an upper and a lower side 11 and 12, respectively. The sides connect substantially perpendicularly to edge surfaces 13, 14 and 15. The edge surfaces form a pointed angle of about 60° with each other. The cutting insert has a central hole 16 for receiving a fastening device, such as a screw, for clamping of the cutting insert against a cutting insert pocket in a holder, not shown. The cutting insert is provided with three substantially identical cutting corners 17 in the areas of the imaginary intersection of the edge surfaces. The cutting corner 17 comprises a leading first cutting insert tip 18a, a trailing second cutting insert tip 18b, a cutting edge 30 which runs along the intersection of a chip surface 19 and a clearance surface 20, and a chip breaker rim 22. The cutting insert has a center axis CL. The cutting edge 30 has the shape of a cross-sectional profile of a thread and is symmetrically located relative to a bisector B through the finished thread top. The bisector is substantially parallel with the connected edge surface 13,14,15 and extends sideways of the center axis CL at a perpendicularly distance L. The distance is 10 to 30% of the imaginary the length of the side of the cutting insert.

In FIG. 3 an enlarged cutting corner is shown. The cutting edge 30 consists of a number of segments smoothly connected to each other and includes a first nose edge 24, a first flank edge 25, a topping edge 26, a second flank edge 27 and a second nose edge 28. The projected length K of the cutting edge is definitely narrower than two thread pitches and less than 1.5, preferably about 1.4 times the thread pitch P. With "projected length" is meant the length of the cutting edge 30 when it is seen in a side view. The cutting edge 30 is substantially concave, wherein the cutting edge is provided to shape diverging thread flanks, substantially in direction towards the central axis of the work piece. The bisector B defines the flank edges 25 and 27, which each forms an acute angle α, of about 25 to 30°, with the bisector B. The leading cutting insert tip 18a projects a distance L1, measured between a line Y perpendicular to the bisector B and touching the topping edge 26, and the extreme point of the nose edge 24. The trailing cutting insert tip 18b extends an additional distance L2 relative to the distance L1. The trailing cutting insert tip 18b extends totally a distance L3. The distance L1 is about 0.47*P, where P is the pitch of the thread or the distance perpendicular to the bisector B, between the extreme points of the cutting tips 18a, 18b. The distance L2 is 0.05 to 0.12*P, preferably about 0.07*P. The total distance L3, i.e. L1 plus L2, of the trailing cutting insert tip 18b is the same as or bigger than the depth of the thread, which is the same as the total depth of infeed of the cutting insert. Furthermore, there is provided a leading edge 29 on the cutting insert tip 18a and a trailing edge 31 on the cutting insert tip 18b. The edges or the passive cutting edges 29,31 are essentially parallel to each other and to the bisectors B,S1,S2 and are facing away from each other. However, these may have other shapes since the edge 31 and the major part of the edge 29 are not intended to cut in the work piece during the entire threading operation. The edge 29 cuts with maximum a third of its extension, counted from the perpendicular distance to the topping edge 26. However, at least the leading edge can be used for chamfering of the work piece where the threading starts. The radius R1 of the first nose edge 24 is maximum 0.23*P and the radius R2 of the second nose edge 28 and the radius R3 of the topping edge 26 is maximum 0.18*P. The second nose edge smoothly connects to a third flank edge 32, which is parallel to the first flank edge 25. The third flank edge 32 is symmetrical with the second flank edge 27 and connects to the trailing edge 31 via a radius of about 0.1*P. The nose edge 28 of the second trailing cutting insert tip 18b further connects to the third flank edge 32 at a perpendicular distance L4 from a tangent T of the extreme point on the cutting corner, which is smaller than the difference L2 between the projections L1,L3 of the cutting tips. The first nose edge 24 connects to the first edge 29 via a radius of about 0.1*P. The leading cutting insert tip 18a has a bisector S1 parallel with the bisector B and perpendicular to a tangent in the extreme point on the cutting insert tip 18a. The trailing cutting insert tip 18b has a bisector S2 parallel with the bisector B and perpendicular to the tangent T in the extreme point on the cutting insert tip 18b. The distances from bisector S1 and S2, respectively, to the bisector B are alike. The distance L5 from the leading edge 29 to the associated bisector S1 is about 0.166*P, while the distance L6 from the trailing edge 31 to the associated bisector S2 is somewhat larger, i.e. about 0.21*P. This means that the width of the trailing cutting insert tip between the edge 31 and the flank edge 27 is always bigger than the width of the leading cutting insert tip 18a between the edge 29 and the flank edge 25. The third flank edge 32 connects to the passive cutting edge 31 at a distance L7 from the tangent T, which distance L7 is larger than the distance L2. The chip surface 19 may be equipped with chip breaker rim running along the cutting edges but may alternatively be provided with chip forming means such as projections, recesses or similar, in connection with the cutting edges.

It is understood that the contours of the cutting tips may be adapted to whichever thread shape is preferable, for example trapezoidal threads and rope threads. The size of the cutting tips depend on the actual thread profile. As shown above the cutting edge 30 of the cutting insert according to the present invention is inverted as compared to the cutting edges of conventional cutting inserts.

Figure 4:
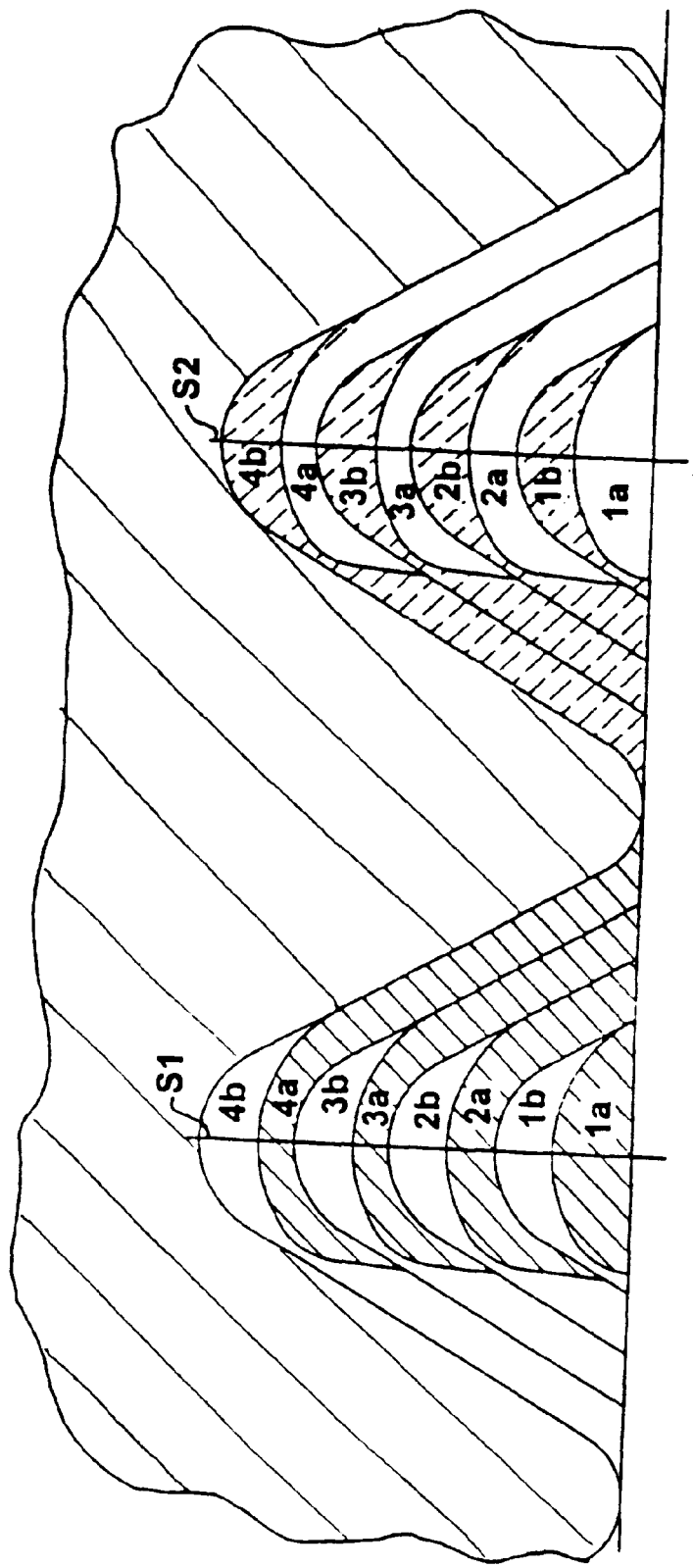
FIG. 4 shows a work piece under a threading period of four passes with the tips of the threading insert.
Figure 6:
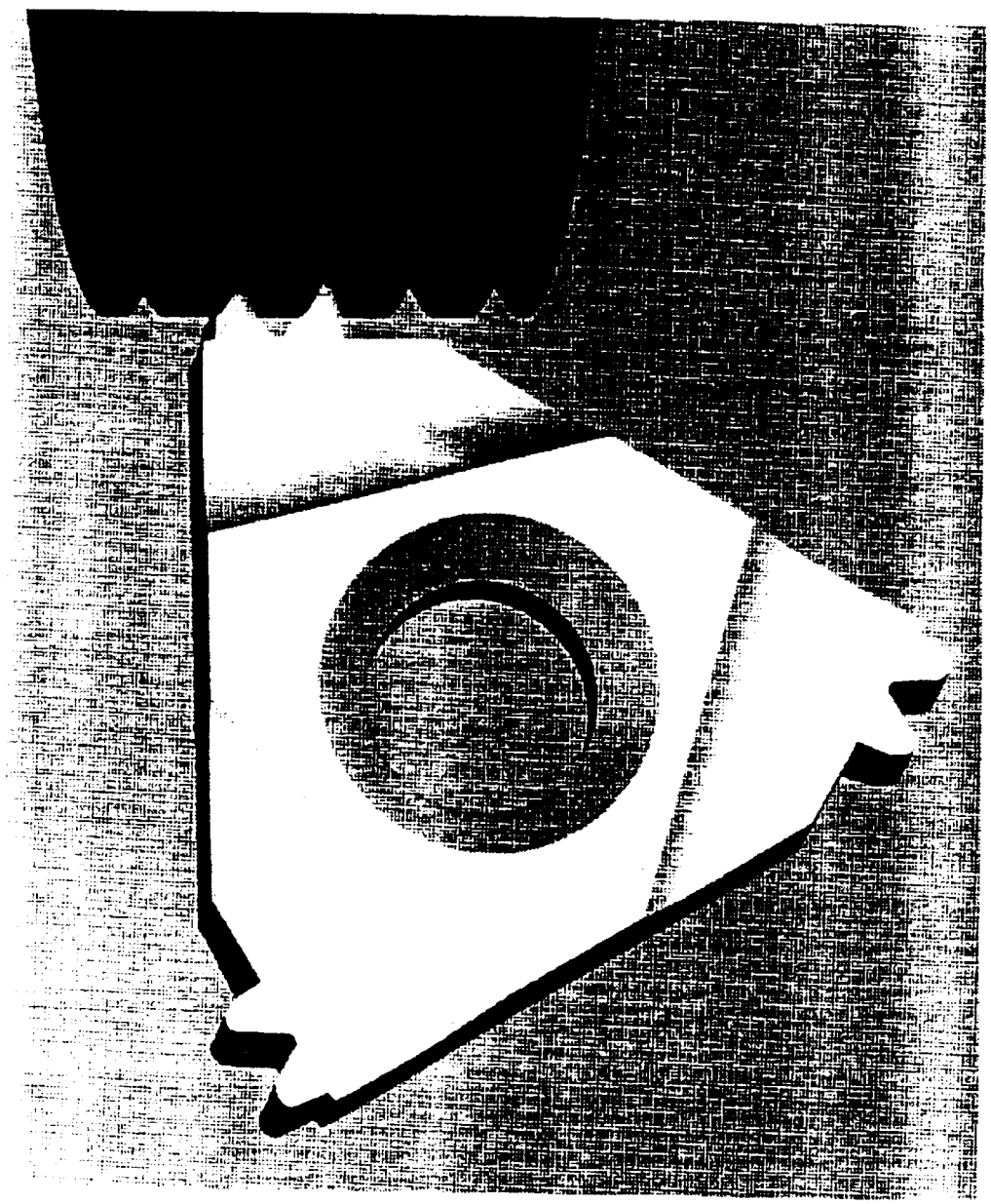
FIG. 6 shows the threading insert according to the present invention in a perspective view in engagement with a work piece.

The function of the cutting insert shall be more closely explained hereinafter in connection with FIGS. 4, 5 and 6, which show radial infeed with a cutting insert according to the present invention. In FIG. 4 shadowed parties are sections of different, after each other machined chips.

In the first pass 1a substantially the entire nose edge 24 of the leading cutting insert tip 18a is brought radially into the work piece a predetermined depth (the depth of the infeed). The depth is preferably chosen to 2*L2. The trailing cutting insert tip 18b, which projects more than the leading cutting insert tip 18a, follows just after the leading cutting insert tip 18a and consequently cuts the area 1b whose depth becomes the first depth of infeed plus the distance L2. During the first pass the leading cutting insert tip 18a performs like a conventional, radially infed threading insert while the chip generated at the trailing tip 18b resembles a chip known from conventional flank infeed. It appears from FIG. 4 that the cutting tips shares the chip creating work which means less strain per tip and longer tool life compared to a cutting insert with only one tip.

During the second pass 2a the leading cutting insert tip 18a is brought still further radially inwards towards the central axis of the work piece, wherein a chip 2a is formed, which has its point of balance to the right of the bisector S1. With "point of balance" is here meant that the chip in the shown cross section is heavier on one side of the associated bisector. The depth is chosen preferably to 2*L2. The edge 29 here somewhat engages the work piece, i.e. less than the radius of the connected nose edge 24. Subsequently the tip 18b gets into engagement and cuts the chip 2b, which has its point of balance to the left of the bisector S2. The edge 31 will not engage during the threading operation. As of the second pass the radially fed cutting insert functions as a cutting insert for alternate flank infeed with good chip control.

During the third pass the leading tip 18a cuts the chip 3a while the trailing tip 18b cuts the chip 3b, like in the latter case above. The depth is preferably chosen to 0.05–0.1 mm.

During the fourth pass the leading tip 18a cuts the chip 4a while the trailing tip 18b cuts the chip 4b, like in the latter case above. The depth is preferably chosen to 0.05–0.1 mm. Then the thread is finish-machined during shortest possible machining time and smallest possible strain per cutting insert tip, simultaneously as good chip control is achieved.

This cutting insert allows considerably larger depth of infeed per pass since the chip creating work is divided up. This means in its turn that the number of passes can be reduced; for example from conventional 8 passes to 4 passes. Thereby shorter time for processing is attained and more details can consequently be produced per shift.

The chip surfaces of the cutting inserts may be provided with recesses and/or projections in order to foremost improve chip forming and in certain cases heat deduction.

What is claimed is:

1. Method for producing a thread in a rotary work piece, wherein a threading insert, including at least one cutting corner having a peripheral edge, creates the shape of the thread through a number of passes along the work piece during radial infeed, wherein the method comprises the following steps:

providing the cutting corner with two cutting tips along its peripheral edge, each cutting tip including a radially, outwardly extending projection, said projections each extending a length in a radial, outward direction from a first imaginary line, said first imaginary line defined as a line drawn perpendicular to a bisector of adjacent flank edges of said cutting tips, wherein said lengths are different, each said cutting tip comprising a cutting edge, which is provided to form a thread top substantially between the cutting tips, wherein the total, projected length of the cutting edge is made less than two thread pitches, feeding the threading insert radially inwardly during simultaneous rotation of the work piece, passing the work piece a number of times with increased depth of infeed at each pass, wherein the cutting tips are brought to co-operate for cutting a top of a thread profile.

2. Method according to claim 1, wherein the cutting edge is substantially concave, wherein the cutting edge is provided to shape divergent flanks, substantially in direction towards an axis of rotation of the work piece, and that the periphery of each cutting insert tip comprises an edge which during threading at least partly are provided at a distance from the work piece in order not to engage the work piece during the threading operation.

3. The method of claim 1, wherein said cutting tip is continuously displaced axially along an outer surface of the workpiece for forming a continuous thread profile.

4. Threading insert for creating threads in a work piece during a number of passes and radial infeed, wherein the threading insert has a polygonal basic shape including at least one cutting corner having a peripheral edge, wherein the cutting corner has two cutting tips along its peripheral edge, each cutting tip including a radially, outwardly extending projection, said projections each extending a length from a first imaginary line, said first imaginary line defined as a line drawn perpendicular to a bisector of adjacent flank edges of said cutting tips, wherein said lengths are different, which cutting tips comprise a cutting edge, which is provided to form a thread top substantially between the cutting tips and that a total, projected length of the cutting edge is smaller than two thread pitches.

5. Threading insert according to claim 4, wherein the cutting edge is substantially concave, wherein the cutting edge is provided to shape, substantially in direction towards the rotational axis of the work piece, divergent flanks on the work piece.

6. Threading insert according to claim 4, wherein each cutting insert tip has a substantially passive edge, which is provided on one side of a bisector of the cutting insert tip, said passive edges facing away from each other.

7. Threading insert according to claim 6, wherein each passive edge is substantially parallel to the associated bisector.

8. Threading insert according to claim 4, wherein the periphery of each cutting insert tip consists of a number of segments and comprises a substantially passive edge, a major cutting edge, a nose edge and a topping edge, said cutting edges facing towards each other and smoothly connecting to associated nose and topping edges, said nose edge of the second trailing cutting insert tip further connecting to a flank edge at a perpendicular first distance, from a tangent of an extreme point of the second trailing cutting tip, which is smaller than a difference between the lengths of the projections of the cutting tips and in that the flank edge connects to the passive cutting edge of the second trailing cutting tip at a second distance from the tangent, which is larger than said difference between the lengths of the projections.

9. Threading insert according to claim 4, wherein the total, projected length of the cutting edge is between 1.1–1.5 times the thread pitch.

10. Threading insert according to claim 4, wherein the chip surface in connection with the cutting edges is provided with chip forming means, that are projections, recesses or a chip breaking edge following the cutting edge.

11. Threading insert according to claim 4, wherein the total, projected length of the cutting edge is about 1.4 times the thread pitch.

12. Threading insert according to claim 4, wherein the total projected length of the cutting edge is about 1.376 times the thread pitch.

* * * * *